March 4, 1924.

W. H. MINER

CENTER BEARING FOR CARS

Filed Nov. 12, 1921

1,485,799

Witnesses
Wm. Geiger

Inventor
William H. Miner
By Geo. J. Haight
His Atty

Patented Mar. 4, 1924.

1,485,799

UNITED STATES PATENT OFFICE.

WILLIAM H. MINER, OF CHAZY, NEW YORK.

CENTER BEARING FOR CARS.

Application filed November 12, 1921. Serial No. 514,443.

*To all whom it may concern:*

Be it known that I, WILLIAM H. MINER, a citizen of the United States, residing at Chazy, in the county of Clinton and State of New York, have invented a certain new and useful Improvement in Center Bearings for Cars, of which the following is a full, clear, concise, and exact description, reference being had to the accompanying drawings, forming a part of this specification.

This invention relates to improvements in center bearings for cars.

One object of the invention is to provide a railway car center bearing of simple and durable form and so constructed that none of the parts are likely to break or get out of order.

Another object of the invention is to provide a center bearing of the character above indicated, so arranged that the relatively movable parts through which the pressure is transmitted are kept immersed in oil under pressure to the end that the friction is reduced to a minimum with consequent prolongation of the life of the bearing.

Figure 1:
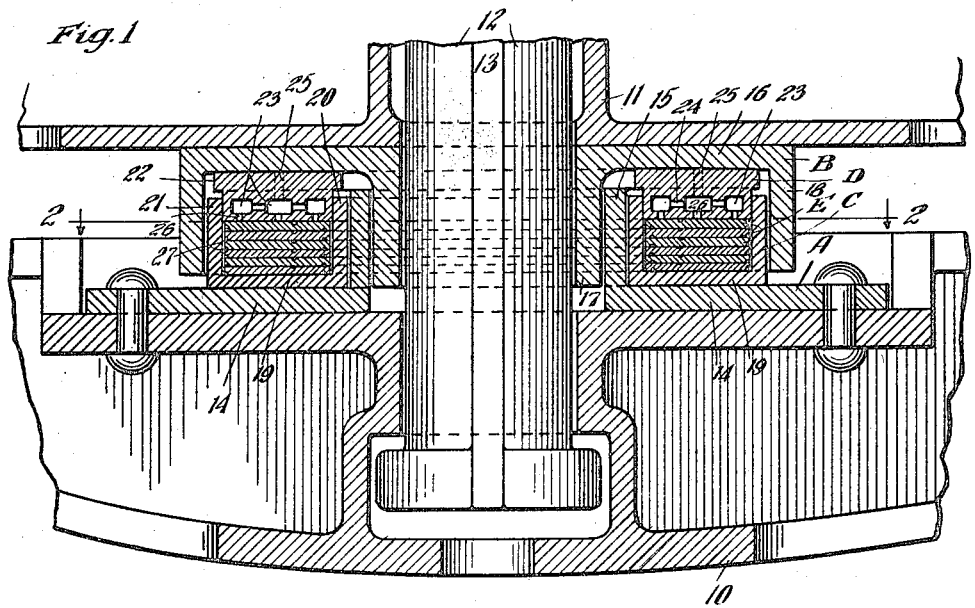
Figure 2:
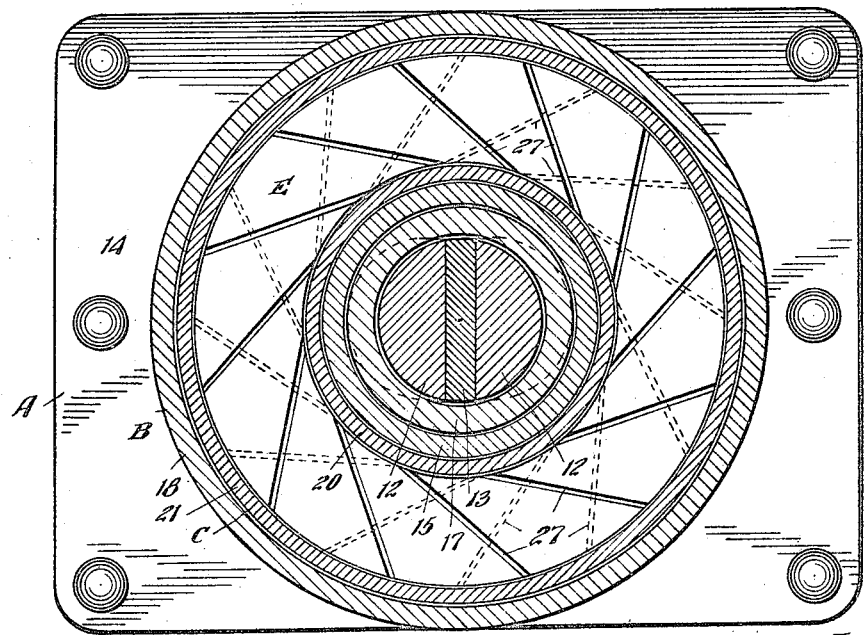

In the drawing forming a part of this specification, Figure 1 is a vertical sectional view taken transversely of a car through one of the king pins thereof, showing my improvements in connection therewith, parts being broken away in order to better accommodate the figure on the sheet. And Fig. 2 is a horizontal sectional view corresponding substantially to the section line 2—2 of Fig. 1.

In said drawing, 10 denotes a truck bolster of a car and 11 a body bolster, the same being apertured at their centers to accommodate a king pin which, in the form shown, comprises two outer semi-circular elements 12—12 and a central spreader 13. Said king pin is of a well-known locking type to prevent vertical separation of the body and truck bolsters, as will be understood.

The improved center bearing, as shown, comprises a lower annular plate A; an upper annular casting B; a second annular member C; an annular pressure-transmitting plate D; and a series of relatively thin plates E—E.

The bottom annular plate A as clearly shown in Fig. 1 is of L-shape in cross-section having a lower horizontally extending side flange 14 resting upon and secured to the truck bolster and an up-standing inner vertical flange 15.

The upper annular member B is of inverted channel cross-section having an upper horizontal web 16, inner circular flange 17 disposed within the flange 15 and an outer circular flange 18.

The annular member C is of U or channel cross-section having a lower horizontally disposed web 19, inner vertically extending flange 20 and outer vertically extending flange 21. Said member C rests upon the flange 14 and is confined between the circular flanges 15 and 18.

The annular member D is provided in the form of a casting of the cross-section shown in Fig. 1 wherein it will be noted that it is laterally extended on its inner and outer edges as indicated at 22—22 to overlie the top edges of the circular flanges 20 and 21. The main part of the member D, below said laterally extended edges 22—22 is of a width, in cross-section, corresponding closely to the distance between the circular up-standing flanges 20 and 21 so as to telescope snugly within the latter and thus provide means for sealing oil or other lubricant within the channel-shaped member C. The member D is suitably cored as indicated at 23—23 to provide pockets or reservoirs for the reception of the lubricant, the cored out spaces being in communication with each other, as by the passages 24. The reservoirs are adapted to be filled through an opening 25 and to allow the oil to seep through the bottom by means of the openings 26—26.

The plates E are preferably of high quality steel machined on both sides and polished so that the same are adapted to act as anti-friction plates or rings. In width, said plates or rings E are slightly less than the distance between the circular upstanding flanges 20 and 21 so that said plates or rings E may shift circumferentially, freely and without binding with respect to the channel-shaped member C. To facilitate the introduction and maintenance of the lubricant between the opposed surfaces of the plates E, each of the latter is provided with a series of oil grooves 27—27 on both faces, said grooves extending more or less tangentially with relation to the flange 20, as best indicated in Fig. 2.

From the preceding description, considered in connection with the drawing, it will be seen that the depending vertical flanges 17 and 18 in conjunction with the up-standing vertical flanges 15 and 21 provide a dust-guard or seal which minimizes the amount of dust or other foreign matter that can work its way to the interior of the bearing. Further, by the arrangement shown and described, oil or other lubricant can be maintained within the channel-shaped member C and on account of the pressure maintained on the oil or other lubricant, thin films of the lubricant can be maintained between the surfaces of the anti-friction plates or rings E so that the relative movement taking place between any two adjacent plates E will not only be very small, but with a minimum of friction. It will also be noted that the number of plates or rings E may be varied so as to provide adjustment to take care of variations in manufacture and wear in service.

I have herein shown and described what I now consider the preferred manner of carrying out the invention but the same is merely illustrative and I contemplate all changes and modifications that come within the scope of the claims appended hereto.

I claim:

1. In a center bearing, the combination with a lower annular member; of an upper annular pressure transmitting member, said members being relatively rotatable; and a series of annular, super-imposed, relatively freely rotatable, relatively thin plates interposed between said upper and lower members.

2. In a center bearing, the combination with a lower annular member of channel-cross-section; of an upper annular pressure-transmitting member, said members being relatively rotatable; and a series of annular, super-imposed, relatively thin finished plates seated within said lower annular member and beneath said upper pressure-transmitting member, said plates being relatively rotatable and arranged in face to face contact.

3. In a center bearing, the combination with a lower annular member of channel-cross-section; of an upper annular pressure-transmitting member; and a series of annular, super-imposed, relatively thin finished plates seated within said lower annular member and beneath said upper pressure-transmitting member, said plates being provided with oil grooves in their surfaces and said lower annular member being adapted to retain oil therein in which said plates are immersed.

4. In a center bearing, the combination with a lower annular member of channel-cross-section with the flanges thereof extending upwardly; of a plurality of annular relatively thin anti-friction plates seated within said lower member; and an upper annular pressure-transmitting member, snugly telescoped within said annular channel-section lower member and bearing upon the uppermost of said plates.

5. In a center bearing for railway cars having body and truck bolsters, the combination with a lower annular plate of L-cross-section secured to the truck bolster; of an annular member of channel-cross-section loosely supported on top of said plate; a series of relatively thin, finished annular plates seated within said channel-cross-section member and adapted to be immersed within oil contained by said member; an annular pressure-transmitting upper plate telescoped within said channel-section member; and an upper annular member of inverted channel cross-section and having the web section thereof seated upon said pressure-transmitting member and the circular flanges thereof telescoping downwardly over the first named member of channel-cross-section to thereby provide a dust-guard for the elements of the bearing.

In witness that I claim the foregoing I have hereunto subscribed my name this 28th day of October, 1921.

WILLIAM H. MINER.

Witnesses:
 UNA C. GRIGSBY,
 ANN BAKER.